(12) United States Patent
Morita et al.

(10) Patent No.: US 8,642,694 B2
(45) Date of Patent: Feb. 4, 2014

(54) BIO-BASED COATING COMPOSITION AND ITS COATED ARTICLE

(75) Inventors: Koji Morita, Osaka (JP); Hirofumi Yamashita, Osaka (JP); Hitomi Ohara, Kyoto (JP); Shiro Kobayashi, Kyoto (JP); Masahiko Ishii, Aichi (JP)

(73) Assignees: Nippon Bee Chemical Co., Ltd., Osaka (JP); National University Corporation Kyoto Institute of Technology, Kyoto (JP); Toyota Jidosha Kabushiki Kaisha, Aichi (JP)

( * ) Notice: Subject to any disclaimer, the term of this patent is extended or adjusted under 35 U.S.C. 154(b) by 534 days.

(21) Appl. No.: 12/713,569

(22) Filed: Feb. 26, 2010

(65) Prior Publication Data

US 2010/0249315 A1    Sep. 30, 2010

(30) Foreign Application Priority Data

Mar. 27, 2009  (JP) .................. 2009-079984

(51) Int. Cl.
| | |
|---|---|
| *C08L 67/04* | (2006.01) |
| *C08G 63/08* | (2006.01) |
| *C08G 63/02* | (2006.01) |
| *C08G 63/06* | (2006.01) |

(52) U.S. Cl.
USPC ............ 524/539; 525/418; 525/450; 525/415

(58) Field of Classification Search
USPC ............................ 524/539; 525/418, 450, 415
See application file for complete search history.

(56) References Cited

U.S. PATENT DOCUMENTS

2007/0160782 A1* 7/2007 Yatsuzuka et al. .......... 428/34.2

FOREIGN PATENT DOCUMENTS

| JP | 06-298921 | 10/1994 | |
|---|---|---|---|
| JP | 08-003297 | 1/1996 | |
| JP | 2003342452 A | * 12/2003 | ............. C08L 67/00 |
| JP | 2004-224887 | 8/2004 | |
| JP | 2006-282960 | 10/2006 | |
| JP | 2006-291000 | 10/2006 | |
| JP | 2008-013744 | 1/2008 | |
| JP | 2008-050514 | 3/2008 | |

OTHER PUBLICATIONS

English machine translation of Tanaka et al. (JP 2003-342452); Apr. 8, 2012.*
Flory, P. J. J. Amer. Chem. Soc. 1952, 74, 2718.*
Bio-based plastics, edited by Polymer Society of Japan, 1st Edition, Kyoritsu Publishing Company, 2006 (includes partial English translation).

* cited by examiner

*Primary Examiner* — Michael Pepitone
(74) *Attorney, Agent, or Firm* — Roylance, Abrams, Berdo & Goodman, L.L.P.

(57) ABSTRACT

There are provided: a bio-based coating composition which is a bio-based ingredient coating composition in consideration of environment and does not need any expensive ingredient and is also excellent in hydrolysis resistance; and an article coated with the coating composition. The bio-based coating composition is characterized by comprising the following film-forming ingredients: a lactic acid polymer (A) which contains a polyfunctional compound having a hydroxyl group and/or a carboxyl group in a functionality of not less than 3 and lactic acid as essential monomer ingredients and has a specific SP value; and a resin (B) which contains a hydroxyl group and/or a carboxyl group and has a specific SP value; wherein the difference ($\Delta$SP) between the SP values of the lactic acid polymer (A) and the resin (B) is in the range of 0.2 to 4.0. The coated article is characterized by being obtained by being coated with the aforementioned coating composition.

10 Claims, No Drawings

BIO-BASED COATING COMPOSITION AND ITS COATED ARTICLE

BACKGROUND OF THE INVENTION

A. Technical Field

The present invention relates to a bio-based coating composition and its coated article. In detail, the present invention relates to: a coating composition based on lactic acid that is a bio-based ingredient; and an article coated with the coating composition.

B. Background Art

At present, plastic substrates are widely used as household goods and industries, and its production amount is vast. Most of such plastic substrates are disposed of as waste after use. However, depending on how to dispose of the waste plastic substrates, they may have bad influences on the global environment.

For example, in cases where incineration disposal is carried out, vain energy becomes necessary for the incineration. In addition, there is a worry that the global warming may proceed due to carbon dioxide generated by the incineration, and further, depending on the ingredient composition of the waste plastic substrates, there is also a case where a hydrogen chloride gas is generated by the incineration and causes acid rain. Moreover, in cases where plastic substrates are scrapped into soil, there are problems that it is becoming difficult to secure sites for the disposal of the waste, and further, there is also a worry that the waste may reside for a long time without decomposition, so that the environment or the ecosystem in soil may be destroyed.

Also as to coating compositions based on plastic substrates, it is general that coated articles having become unnecessary after use are disposed of by releasing their coating films from base materials and thereafter incinerating the released coating films or scrapping them into soil. Therefore, there are still the above problems.

Thus, bio-based plastics are proposed as substitutes for conventional plastics based on fossil fuels such as petroleum and coals which conventional plastics cause the above problems. For example, bio-based polymers are proposed such as polyhydroxyalkanoic acids, polysuccinic acid alkylenes, and polysaccharides (refer to non-patent document 1 below).

As more specific prior arts, for example, the following arts are proposed.

A coating in which a modified starch is used as a bio-based ingredient is proposed (e.g. refer to patent documents 1 to 3 below). However, the modified starch has defects such that it is brittle and therefore weak to such as bending and easy to scratch. Therefore, the modified starch cannot be used in a wide range, and further is poor in long-time stability such as hydrolysis resistance. In addition, there is a defect that the production cost for carrying out the alkylation of starch is high.

A macromonomer of a polylactic acid and a polymer of this macromonomer are also proposed (refer to patent document 4 below). However, without using a cyclic lactide, such a macromonomer would be difficult to obtain in a high yield. Therefore, the macromonomer becomes expensive similarly to the modified starch.

As a resin composition for coatings, a polylactic acid obtained by copolymerizing lactic acid, a dicarboxylic acid and a glycol is proposed (refer to patent document 5 below). However, by this art, a coating film having a sufficient hydrolysis resistance cannot be obtained.

As other arts using a polylactic acid, there are also proposed such as a polylactic acid resin coating composition having an excellent low-temperature adhesive property (refer to patent document 6 below) and an adhesive for wrapping films which adhesive is excellent in transparency, preservation stability, and adhesion by using a polylactic acid emulsion (refer to patent document 7 below). However, as to these methods, plasticizers or emulsifiers need to be used in amounts larger than conventional, and coating film properties such as hardness and scratch resistance are not sufficient, and further, also as to the problem of the hydrolysis resistance, no solution of such a problem is intended.

PRIOR ART DOCUMENTS

Patent Documents

[Patent Document 1]: JP-A-2004-224887
[Patent Document 2]: JP-A-2006-282960
[Patent Document 3]: JP-A-2008-13744
[Patent Document 4]: JP-A-6-298921
[Patent Document 5]: JP-A-8-3297
[Patent Document 6]: JP-A-2006-291000
[Patent Document 7]: JP-A-2008-50514

Non-Patent Document

[Non-Patent Document 1]: "Bio-based Plastics", edited by Polymer Society of Japan, 1st Edition, Kyoritsu Publishing Company, 2006.

SUMMARY OF THE INVENTION

A. Object of the Invention

Thus, an object of the present invention is to provide: a bio-based coating composition which is a bio-based ingredient coating composition in consideration of environment and does not need any expensive ingredient and is also excellent in hydrolysis resistance; and an article coated with the coating composition.

B. Disclosure of the Invention

The present inventors diligently studied to achieve the above object. As a result, they have completed the present invention by finding out and confirming the following facts. That is to say, if a coating composition is made to comprise, as a film-forming ingredient, a lactic acid polymer (A) which contains a polyfunctional compound having a hydroxyl group and/or a carboxyl group in a functionality of not less than 3 and lactic acid as essential monomer ingredients and has an SP value of 10.0 to 15.0, then this lactic acid polymer (A) can be easily obtained at a low cost and will also provide excellent hydrolysis resistance. Furthermore, if a resin (B) which contains a hydroxyl group and/or a carboxyl group and has an SP value of 9.5 to 14.0 is used jointly with the polymer (A) and if the difference ($\Delta$SP) between the SP values of the lactic acid polymer (A) and the resin (B) is adjusted in the range of 0.2 to 4.0, then the hydrolysis resistance is still more enhanced.

A reason why, as aforementioned, the lactic acid polymer (A) gives excellent hydrolysis resistance seems to be that since the lactic acid polymer (A) has a highly branched structure, its steric hindrance is larger than those of linear structures such as of conventional lactic acid polymers, so that such a large steric hindrance hinders substances, which cause hydrolysis, from approaching an ester bond. In addition, a reason why the hydrolysis resistance is still more enhanced by jointly using the lactic acid polymer (A) having an SP value of 10.0 to 15.0 and the resin (B) having an SP value of 9.5 to 14.0 with the difference (ΔSP) between the SP values of the lactic acid polymer (A) and the resin (B) being adjusted in the range of 0.2 to 4.0 seems to be that when the coating composition is cured, a water-repellent ingredient based on the resin (B) having an SP value of 9.5 to 14.0 transfers to a surface layer of a coating film (since this SP value is closer to that of air) and protects an ingredient based on the lactic acid polymer (A) which is retained inside of the film since the polymer (A) has a higher SP value than the resin (B).

That is to say, a bio-based coating composition according to the present invention is characterized by comprising the following film-forming ingredients:

a lactic acid polymer (A) which contains a polyfunctional compound having a hydroxyl group and/or a carboxyl group in a functionality of not less than 3 and lactic acid as essential monomer ingredients and has an SP value of 10.0 to 15.0; and a resin (B) which contains a hydroxyl group and/or a carboxyl group and has an SP value of 9.5 to 14.0;

wherein the difference (ΔSP) between the SP values of the lactic acid polymer (A) and the resin (B) is in the range of 0.2 to 4.0.

In addition, a coated article according to the present invention is characterized by being obtained by being coated with the aforementioned coating composition.

C. Effects of the Invention

In the present invention, the cost of the ingredients can be reduced since the lactic acid polymer (A) which is used as a film-forming ingredient contains inexpensively available lactic acid and a polyhydric alcohol or polycarboxylic acid as essential monomer ingredients and since the polymerization of this polymer (A) can also be easily carried out. In addition, very excellent hydrolysis resistance is displayed by: using, as an essential monomer ingredient of the lactic acid polymer (A), a polyfunctional compound having a hydroxyl group and/or a carboxyl group (these groups can be sites of reactions with lactic acid) in a functionality of not less than 3; using, as the lactic acid polymer (A), such as has an SP value of 10.0 to 15.0; and jointly using this lactic acid polymer (A) and the resin (B) having a hydroxyl group and/or a carboxyl group and having an SP value of 9.5 to 14.0 with the difference (ΔSP) between the SP values of the lactic acid polymer (A) and the resin (B) being adjusted in the range of 0.2 to 4.0.

DETAILED DESCRIPTION OF THE INVENTION

Hereinafter, detailed descriptions are given about modes for carrying out the present invention. However, the scope of the present invention is not bound to these descriptions. And other than the following illustrations can also be carried out in the form of appropriate modifications of the following illustrations within the scope not departing from the spirit of the present invention.

[Film-Forming Ingredients]:

The coating composition according to the present invention essentially comprises, as film-forming ingredients, the lactic acid polymer (A) and the resin (B) which are hereinafter specified.

<Lactic Acid Polymer (A)>:

The lactic acid polymer (A) in the present invention contains a polyfunctional compound having a hydroxyl group and/or a carboxyl group in a functionality of not less than 3 and lactic acid as essential monomer ingredients and has an SP value of 10.0 to 15.0. As to the SP value, it is herein later mentioned together with the SP value of the resin (B).

By using the polyfunctional compound having a functionality of not less than 3 as an essential monomer ingredient, a highly branched lactic acid polymer is obtained, so that excellent hydrolysis resistance is achieved.

Examples of the polyfunctional compound include: branched type alcohols such as trimethylolpropane, pentaerythritol, glycerol, polyglycerol and xylitol; polyhydric alcohols such as acrylic copolymers containing hydroxy (meth)acrylates; aromatic carboxylic acids such as trimellitic acid; and polycarboxylic acids such as acrylic copolymers containing (meth)acrylic acid. Furthermore, there are also included compounds jointly having a hydroxyl group and a carboxyl group in a molecule such as dimethylolpropanoic acid and dimethylolbutanoic acid. These compounds can be used either alone respectively or in combinations with each other.

Examples of monomer ingredients other than the above specific polyfunctional compounds and lactic acid include: dihydric alcohols such as 1,4-butanediol and 2-methyl-1,3-propanediol; dicarboxylic acids such as adipic acid and succinic acid; and hydroxyalkanoic acids other than lactic acid, such as glycolic acid, 4-hydroxybutyric acid, 3-hydroxyvaleric acid and 3-hydroxyhexanoic acid.

As mentioned above, the monomer ingredients of the lactic acid polymer (A) according to the present invention may include monomer ingredients having a functionality of 2. However, the average functionality in monomer ingredients other than the hydroxyalkanoic acids is favorably in the range of 2.2 to 30, more favorably 2.5 to 10. In cases where the average functionality is less than 2.2, there is a worry that a sufficiently branched structure cannot be obtained, so that desirable hydrolysis resistance cannot be obtained, and further, in reactions with curing agents, there is also a worry that the number of terminal ends (which can be crosslinking sites) of branched chains may be so small that it becomes difficult to obtain a high crosslinking density, so that the properties of coating films such as solvent resistance and alkali resistance are deteriorated. In cases where the average functionality exceeds 30, there is a worry that the viscosity during the polymerization may be so high that industrial production becomes difficult, and the resultant coating film becomes brittle.

In addition, in order to industrially inexpensively obtain the polymer, the ratio of lactic acid in hydroxyalkanoic acids is favorably not less than 60 weight %, more favorably not less than 80 weight %.

When the lactic acid polymer (A) is obtained from the above monomer ingredients, as to the hydroxyalkanoic acid and another polyfunctional compound, the ratio of the hydroxyalkanoic acid is favorably in the range of 1 to 50 mol, more favorably 3 to 30 mol, per 1 mol of hydroxy groups or carboxyl groups possessed by the polyfunctional compound other than the hydroxyalkanoic acid. In cases where the above ratio is less than 1 mol, there is a worry that in consideration of such as curing with isocyanate compounds and curing with epoxy compounds, the bio-based content may be poor, and also the crosslinking density may be increased too much, thus resulting in poor flexibility. In cases where the above ratio exceeds 50 mol, there is a worry that to the contrary, the crosslinking density may become too low, thus resulting in poor properties of coating films such as hardness, solvent resistance and hydrolysis resistance.

The lactic acid polymer (A) can be obtained by known methods, for example, by running a reaction in the range of 150 to 220° C. using the above monomer ingredients while formed water is removed by azeotropic distillation with such as xylene.

<Resin (B)>:

The resin (B) in the present invention contains a hydroxyl group and/or a carboxyl group and has an SP value of 9.5 to 14.0. By using it jointly with the lactic acid polymer (A), particularly the hydrolysis resistance and the light resistance are enhanced. As to the SP value, it is herein later mentioned together with the SP value of the lactic acid polymer (A).

The above resin (B) applicable to the present invention is not especially limited, if it satisfies the above conditions. Examples thereof include acrylic resins, polyurethane resins, polyester resins, polycarbonate resins, alkyd resins, and epoxy resins. These can be used either alone respectively or in combinations with each other. Above all, acrylic resins containing a hydroxyl group and/or a carboxyl group are favorably used.

As to the aforementioned resin (B) according to the present invention, the total of the hydroxyl group value and acid value is favorably in the range of 10 to 260 mgKOH/g, more favorably 40 to 180 mgKOH/g. In cases where the above total exceeds 260 mgKOH/g, there is a worry that the crosslinking density may be increased too much, thus resulting in poor flexibility. In cases where the above total is less than 10 mgKOH/g, there is a worry that to the contrary, the crosslinking density may become too low, thus resulting in poor properties of coating films such as hardness, solvent resistance and alkali resistance.

In cases where the acid value of the lactic acid polymer (A) is not more than 5 mgKOH/g, the aforementioned resin (B) according to the present invention can be used as a material for dissolving or dispersing it into an aqueous solvent together with the lactic acid polymer (A). In such a case, the acid value of the resin (B) is favorably not less than 5 mgKOH/g, more favorably not less than 10 mgKOH/g. In cases where the acid value of the resin (B) is less than 5 mgKOH/g, it becomes difficult to stably disperse the resin (B) into an aqueous solvent.

The number-average molecular weight of the aforementioned resin (B) according to the present invention is favorably in the range of 1,000 to 100,000, more favorably 4,000 to 40,000. In cases where the above number-average molecular weight is less than 1,000, there is a worry that the resulting coating film may be brittle. In cases where the above number-average molecular weight exceeds 100,000, there is a worry that the viscosity of the coating composition may rise too much, thus resulting in a coating composition which is not suitable for spray coating.

As mentioned above, the aforementioned resin (B) according to the present invention contains a hydroxyl group and/or a carboxyl group. Specifically, this resin (B) can, for example, be obtained by (co)polymerizing one or more of the following known monomer ingredients: alkyl (meth)acrylates such as methyl acrylate, ethyl acrylate, n-butyl acrylate, isobutyl acrylate, t-butyl acrylate, propyl acrylate, cyclohexyl acrylate, 2-ethylhexyl acrylate, lauryl acrylate, stearyl acrylate, dodecyl acrylate, isobornyl acrylate, methyl methacrylate, ethyl methacrylate, n-butyl methacrylate, isobutyl methacrylate, t-butyl methacrylate, propyl methacrylate, cyclohexyl methacrylate, 2-ethylhexyl methacrylate, lauryl methacrylate, stearyl methacrylate, dodecyl methacrylate, and isobornyl methacrylate; oxirane-group-containing acrylic monomers having an oxirane group or oxetanyl group and a (meth)acryloyl group in a molecule, such as glycidyl methacrylate, 3,4-epoxycyclohexylmethyl methacrylate, and 3-ethyl-3-methacryloyloxymethyloxetane; hydroxyl-group-containing acrylic monomers having a hydroxyl group and a (meth)acryloyl group in a molecule, such as 2-hydroxyethyl acrylate, 2-hydroxypropyl acrylate, 4-hydroxybutyl acrylate, 2-hydroxyethyl methacrylate, 2-hydroxypropyl methacrylate, and 4-hydroxybutyl methacrylate; carboxyl-group-containing acrylic monomers having a carboxyl group and a (meth)acryloyl group in a molecule, such as acrylic acid, methacrylic acid, and β-carboxyethyl acrylate; and alkoxysilyl-group-containing acrylic monomers having an alkoxysilyl group and a (meth)acryloyl group in a molecule, such as γ-methacryloyloxypropyltrimethoxysilane. In addition, within the range where the effects of the present invention are not damaged, it is possible to jointly use monomers other than acrylic monomers, such as vinyl aromatic compounds such as styrene.

<SP Values of Lactic Acid Polymer (A) and Resin (B)>:

The SP value of the lactic acid polymer (A) according to the present invention is in the range of 10.0 to 15.0, favorably 11.0 to 13.5.

In addition, the SP value of the resin (B) according to the present invention is in the range of 9.0 to 14.0, favorably 9.5 to 13.5. In cases where this SP value is either less than 9.0 or exceeds 14.0, it becomes difficult to provide sufficient hydrolysis resistance.

The difference ($\Delta$SP) between the SP values of the lactic acid polymer (A) and the resin (B) is a value obtained by subtracting the SP value of the resin (B) from the SP value of the lactic acid polymer (A), and in the present invention, this $\Delta$SP is in the range of 0.2 to 4.0, favorably 0.5 to 2.5. In cases where the aforementioned $\Delta$SP is less than 0.2, there is a worry that the transfer of the resin (B) to a surface layer of a coating film may be suppressed, so that such as hydrolysis resistance, weather resistance or acid resistance cannot be sufficiently obtained. In cases where the aforementioned $\Delta$SP exceeds 4.0, there is a worry that the compatibility may be deteriorated, so that an opaque coating film may be formed. For example, it is favorable to set the SP value of the lactic acid polymer (A) in the range of 11.5 to 13.5 and the SP value of the resin (B) in the range of 9.5 to 11.0.

Incidentally, the above SP value (solubility parameter) can be measured by turbidity point titration. Specifically, it is a value calculated in accordance with the following equation as described in equations of K. W. SUH and J. M. CORBETT (Journal of Applied Polymer Science, Vol. 12, p. 2359, published in 1968).

$$SP\ \text{value} = (V_H^{1/2} \cdot \delta_H + V_D^{1/2} \cdot \delta_D)/(V_H^{1/2} + V_D^{1/2})$$

(wherein $V_H$ represents a volume fraction of n-hexane, $V_D$ represents a volume fraction of deionized water, $\delta_H$ represents an SP value of n-hexane, and $\delta_D$ represents an SP value of deionized water)

In the turbidity point titration, n-hexane is gradually added into 0.5 g of a dried resin composition (non-volatiles) dissolved in 10 ml of acetone, and the titration amount H (ml) at the turbidity point is read. In the same way, deionized water is added into the acetone solution, and the titration amount D (ml) at the turbidity point is read. These titration amounts H and D are applied to the following equations to calculate $V_H$, $V_D$, $\delta_H$ and $\delta_D$. Incidentally, the SP value of each solvent is as follows: acetone: 9.75, n-hexane: 7.24, deionized water: 23.43.

$$V_H = H/(10+H)$$

$$V_D = D/(10+D)$$

$$\delta_H = 9.75 \times 10/(10+H) + 7.24 \times H/(10+H)$$

$$\delta_D = 9.75 \times 10/(10+D) + 23.43 \times D/(10+D)$$

<Curing Agent>:

The coating composition according to the present invention usually contains, as a curing agent, a compound having a functional group capable of reacting with the hydroxyl group and/or the carboxyl group in the film-forming ingredients. Examples of such a curing agent include the following isocyanate compounds, carbodiimide compounds and epoxy compounds.

(Isocyanate Compounds):

As to the isocyanate compounds, if they are compounds having two or more isocyanate groups (—NCO) in a molecule, then they are not especially limited. Examples thereof include: aromatic ones such as tolylene diisocyanate, 4,4'-diphenylmethane diisocyanate, xylylene diisocyanate and meta-xylylene diisocyanate; aliphatic ones such as hexamethylene diisocyanate; alicyclic ones such as isophorone diisocyanate; and their monomers and their polymers such as biuret types, nurate types and adduct types. Commercially available products of the above polyisocyanates include Duranate 24A-90PX (NCO: 23.6%, produced by Asahi Kasei Corporation), Sumidur N-3200-90M (produced by Sumitomo-Bayer Urethane Co., Ltd.), Takenate D165N-90X (produced by Mitsui-Takeda Chemicals, Ltd.), Sumidur N-3300, Sumidur N-3500 (both produced by Sumitomo-Bayer Urethane Co., Ltd.) and Duranate THA-100 (produced by Asahi Kasei Corporation). In addition, for aqueous coating compositions, water-dispersible type polyisocyanates obtained by modifying the above polyisocyanates with a hydrophilic group by reactions can be used. Commercially available products thereof include Bayhydur 305 (produced by Bayer AG) and Duranate WB40-100 (produced by Asahi Kasei Corporation).

As the isocyanate compounds, it is also possible to use blocked isocyanate compounds in which the isocyanate groups are blocked with substituted phenols, oximes, alkyl acetoacetates, alkyl malonates, phthalimides, imidazoles, hydrogen chloride, hydrogen cyanide or sodium hydrogensulfite. Commercially available products thereof include Duranate 17B-60PX (produced by Asahi Kasei Corporation) and Duranate TPA-B80E (produced by Asahi Kasei Corporation).

(Carbodiimide Compounds):

The carbodiimide compounds are compounds having a carbodiimide group (—N=C=N—) in a molecule. Examples of their commercially available products include Carbodirite V-05 (Nisshinbo Co., Ltd.) and Carbodirite V-02 (Nisshinbo Co., Ltd.).

(Epoxy Compounds):

Examples of the epoxy compounds include: diglycidyl ether of bisphenol A and its oligomers, diglycidyl ether of hydrogenated bisphenol A and its oligomers, diglycidyl ortho-phthalate, diglycidyl isophthalate, diglycidyl terephthalate, diglycidyl p-oxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether and polyalkylene glycol diglycidyl ethers, triglycidyl trimellitate, triglycidyl isocyanurate, 1,4-diglycidyloxybenzene, diglycidyl propylene urea, glycerol triglycidyl ether, trimethylolethane triglycidyl ether, trimethylolpropane triglycidyl ether, pentaerythritol tetraglycidyl ether, glycerol alkylene oxide adduct triglycidyl ether.

<Other Film-forming Ingredients>:

Within the range where the effects of the present invention are not damaged, ingredients other than the above lactic acid polymer (A), resin (B) and curing agent may be contained as film-forming ingredients.

Examples of such other film-forming ingredients include polyester resins, polyurethane resins, polycarbonate resins and alkyd resins other than the above lactic acid polymer (A), resin (B) and curing agent.

<Mixing of Film-forming Ingredients>:

The mixing ratio of the lactic acid polymer (A)/the resin (B) is, by weight, favorably in the range of 95/5 to 25/75, more favorably 90/10 to 50/50. In cases where the ratio of the resin (B) is less than 5, there is a worry that the hydrolysis resistance or light resistance may be insufficient. In cases where the ratio of the resin (B) exceeds 75, there is a worry that the bio-based content may be poor.

In cases where the curing agent is mixed, although its mixing ratio is not especially limited, for example, the ratio of the functionality of the hydroxyl group and/or the carboxyl group in the film-forming ingredients (in cases where only either kind of functional group is contained, the functionality of this functional group; but in cases where both kinds of functional groups are contained, the total functionality of these functional groups), relative to the functionality of the curing agent's aforementioned functional group capable of reacting with a hydroxyl group and/or a carboxyl group, is favorably in the range of 70:30 to 30:70, more favorably 60:40 to 40:60. In cases where the functionality of the hydroxyl group and/or the carboxyl group in the film-forming ingredients is relatively excessive, there is a worry that the crosslinking may be insufficient, so that the hydrolysis resistance may be deteriorated. In cases where the functionality of the curing agent's aforementioned functional group capable of reacting with a hydroxyl group and/or a carboxyl group is relatively excessive, there is a worry that the deterioration of the coating film performance may be brought about. When, as herein later mentioned, the carbodiimide compound as a curing agent is used also as a hydrolysis inhibitor, then it is permitted to mix the curing agent intentionally in excess of the aforementioned range.

In addition, in cases where the ingredient other than the above lactic acid polymer (A), resin (B) and curing agent is mixed, the ratio of such another ingredient is favorably not more than 10 weight % in the film-forming ingredients. In cases where this ratio exceeds 10 weight %, there is a worry that the effects of the present invention may be damaged.

[Other Ingredients of Coating Composition]:

The coating composition according to the present invention favorably contains the carbodiimide compound as a hydrolysis inhibitor.

That is to say, the carbodiimide compound can inhibit the deterioration of coating film performances such as water resistance and alkali resistance by reacting with a carboxyl group when the lactic acid polymer (A) in the coating composition undergoes hydrolysis and thus forms the carboxyl group. In addition, it becomes possible to more enhance the coating film performances such as water resistance and alkali resistance, for example, by reacting with a residual carboxyl group of the lactic acid polymer (A) and/or with a carboxyl group of a lactic acid oligomer which may possibly be contained in the coating composition as a by-product from the lactic acid polymer (A).

The carbodiimide compound as a hydrolysis inhibitor favorably has the carbodiimide group in an average functionality of not less than 3 and an isocyanate group at a terminal end. Because of the average functionality of the carbodiimide group being not less than 3, the effect as the hydrolysis inhibitor is obtained with a good result. Because of having an isocyanate group at a terminal end, the performances of the resultant coating film is stabilized by also interacting with a hydroxyl group.

Incidentally, in cases where a film-forming ingredient has a carboxyl group, then, as mentioned above, the carbodiimide compound can be used as a curing agent. However, by setting the mixing amount of the carbodiimide compound in excess of an amount necessary as a curing agent, a residual carbodiimide compound in a cured film can be utilized as a hydrolysis inhibitor.

The coating composition according to the present invention may, if necessary, further contain conventional known coloring agents. Examples thereof include natural colors, organic pigments, inorganic pigments, extenders, electroconductive pigments, and metallic pigments. The aforementioned coloring agents are not limited to those which are dispersed into solvents, but may be those which are dissolved into solvents.

Examples of the aforementioned natural colors include carotenoid colors, flavonoid colors, flavin colors, quinone colors, porphyrin colors, diketone colors, and betacyanidin colors. Examples of the aforementioned carotenoid colors include carotene, carotenal, capsanthin, lycopene, bixin, crocin, canthaxanthin and annatto. Examples of the aforementioned flavonoid colors include: anthocyanidins such as shisonin, raphanin and enociana; chalcones such as safrole yellow and saflower; flavonols such as rutin and quercetin; and flavones such as cacao colors. Examples of the aforementioned flavin colors include riboflavin. Examples of the aforementioned quinone colors include: anthraquinones such as laccaic acid, carminic acid (cochineal), kermesic acid and alizarin; and naphthoquinones such as shikonin, alkhanin and ehinochrome. Examples of the aforementioned porphyrin colors include chlorophyll and blood color. Examples of the aforementioned diketone colors include curcumin (turmeric). Examples of the aforementioned betacyanidin colors include betanin.

Examples of the aforementioned organic pigments include azolake pigments, insoluble azo pigments, condensed azo pigments, phthalocyanine pigments, indigo pigments, perinone pigments, perylene pigments, phthalon pigments, dioxazine pigments, quinacridone pigments, isoindolinone pigments, benzimidazolone pigments, diketopyrrolopyrrole pigments, and metal complex pigments (e.g. phthalocyanine blue, phthalocyanine green, carbazole violet, anthrapyrimidine yellow, flavanthrone yellow, isoindoline yellow, indanthron blue and quinacridone violet).

Examples of the aforementioned inorganic pigments include yellow iron oxide, red iron oxide, carbon black, titanium dioxide, chromium oxide, lead chromate, chrome yellow and Prussian blue.

Examples of the aforementioned extenders include talc, calcium carbonate, precipitated barium sulfate, and silica.

Examples of the aforementioned electroconductive pigments include electroconductive carbon, and whisker coated with antimony-doped tin oxide.

Examples of the aforementioned metallic pigments include aluminum flakes, copper bronze flakes, mica-shaped iron oxide, mica flakes, mica-shaped iron oxide coated with metal iron oxide, and mica flakes coated with metal iron oxide.

The aforementioned coloring agents may be used either alone respectively or in combinations with each other.

Although not especially limited, the mixing ratio of the aforementioned coloring agents is, for example, in the range of 0.001 to 400 weight parts, favorably 0.01 to 200 weight parts, per 100 weight parts of the aforementioned hydroxyl-group-containing resin according to the present invention.

The coating composition according to the present invention may, if necessary, further contain conventional known additives. Examples thereof include surface conditioners, rheology control agents, pinhole inhibitors, antisagging agents, ultraviolet absorbents, antioxidants, ultraviolet stabilizers, matting agents, burnishing agents, antiseptic agents, curing promoters, curing catalysts, scratch inhibitors, and defoaming agents.

The coating composition according to the present invention can, for example, be used in the form of a liquid by dissolving or dispersing the above film-forming ingredients and other coating materials into a solvent.

The coating composition according to the present invention may be an organic solvent type coating composition in which the film-forming ingredients are dissolved or dispersed in an organic solvent, or may be an aqueous coating composition in which the film-forming ingredients are dissolved or dispersed in an aqueous solvent.

Examples of the aforementioned organic solvent include aliphatic solvents, aromatic solvents, ester solvents, ether solvents, ketone solvents, and alcohol solvents. The aforementioned organic solvents may be used either alone respectively or in combinations with each other. In addition, the aforementioned organic solvents do not need to be organic solvents as defined in the strict meaning as consisting of organic compounds. If they are those which are commonly recognized as organic solvents, then they may, for example, be those which contain a small amount of water.

In cases where the aforementioned aqueous solvent is used, for example, in cases where a carboxyl group exists in a film-forming ingredient, this film-forming ingredient can be sufficiently dissolved or dispersed into water by neutralizing the carboxyl group with an alkali (e.g. amine compounds), so that an excellent aqueous coating composition can be obtained. It is enough that the aforementioned aqueous solvent is that which is commonly recognized as an aqueous solvent. The aforementioned aqueous solvent may consist of water, or may further contain a small amount of organic solvent (e.g. hydrophilic organic solvents such as ester solvents, ether solvents, ketone solvents, and alcohol solvents).

Such a liquid coating composition can, for example, coated by such as roller coating, brush coating, dip coating, spray coating (e.g. non-electrostatic-deposition coating, electrostatic deposition coating), and curtain flow coating.

The coating composition according to the present invention can also be used as a solid powder coating composition. In such a case of being used as the powder coating composition, the number-average particle diameter is favorably in the range of 1 to 150 µm, more favorably 2 to 100 µm. Examples of the powder coating method include flowing dip coating, electrostatic deposition powder coating, corona, and friction electrification coating.

The coating composition according to the present invention can be thermoset by using such as hot air driers, infrared driers, and far-infrared driers. Although not especially limited, the thickness of its coating film is, for example, in the range of 1 to 200 µm, more favorably 2 to 150 µm.

[Uses of Coating Composition]:

The base material to be coated with the coating composition according to the present invention is not especially limited, but is exemplified by plastics, metals, glass, ceramics, wood, plants, rocks, and sand. However, since the coating composition according to the present invention is excellent in adhesion particularly to a polylactic acid type base material, this type base material is favorably used as the base material to be coated.

The coating composition according to the present invention is, for example, coated onto the above base material to be coated, and thereby can favorably be used as such as adhesives, pressure sensitive adhesives, pressure sensitive adhesive-adhesive transfer type adhesives, coatings for plastics and metals, inks for paper, and aqueous inks. Particularly, the coating composition according to the present invention is excellent in uses as coatings, wherein the coatings are not limited to those for the purpose of surface-protecting or surface-decorating effects, but also include special coatings provided with other purposes such as electroconductive coatings, insulating coatings, and fire-resistant coatings.

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to these. Hereinafter, for convenience, the unit "weight %" may be referred to as "%".

Synthesis Examples of Lactic Acid Polymers (A)

Synthesis Example 1

A separable flask of 1 L in capacity as equipped with a thermostat, a stirring blade, a nitrogen-introducing inlet, a dean-stark trap and a reflux condenser was charged with 22.6 g of trimethylolpropane, 727.4 g of L-lactic acid (produced by Purac Ltd.), 50 g of toluene, and 0.15 g of p-toluenesulfonic acid. In addition, the dean-stark trap was filled with toluene to the upper limit. Under a nitrogen gas flow, the temperature in the system was raised to 140° C., which was retained for 1 hour. Furthermore, the temperature in the system was raised to 175° C., and a condensation reaction was continued for 5 hours. After it had been confirmed that the acid value of the resin had become not more than 4 mgKOH/g (resin nonvolatile), cooling was started. After the cooling, butyl acetate was added to adjust the nonvolatile content to 80%.

The resultant lactic acid polymer (A) had a lactic acid average polymerization degree of 16, an SP value of 11.9 and a hydroxyl group value of 46.9 mgKOH/g.

Synthesis Example 2

The same reactor as of Synthesis Example 1 was charged with 64.7 g of pentaerythritol, 685.3 g of L-lactic acid (produced by Purac Ltd.), 60 g of toluene, and 0.15 g of p-toluenesulfonic acid. In addition, the dean-stark trap was filled with toluene to the upper limit. Under a nitrogen gas flow, the temperature in the system was raised to 140° C., which was retained for 1 hour. Furthermore, the temperature in the system was raised to 175° C., and a condensation reaction was continued for 5 hours. After it had been confirmed that the acid value of the resin had become not more than 4 mgKOH/g (resin nonvolatile), cooling was started. After the cooling, butyl acetate was added to adjust the nonvolatile content to 80%.

The resultant lactic acid polymer (A) had a lactic acid average polymerization degree of 4, an SP value of 12.4 and a hydroxyl group value of 174.2 mgKOH/g.

Synthesis Example 3

The same reactor as of Synthesis Example 1 was charged with 65.9 g of sorbitol, 684.1 g of L-lactic acid (produced by Purac Ltd.), 50 g of toluene, and 0.15 g of p-toluenesulfonic acid. In addition, the dean-stark trap was filled with toluene to the upper limit. Under a nitrogen gas flow, the temperature in the system was raised to 140° C., which was retained for 1 hour. Furthermore, the temperature in the system was raised to 175° C., and a condensation reaction was continued for 5 hours. After it had been confirmed that the acid value of the resin had become not more than 4 mgKOH/g (resin nonvolatile), cooling was started. After the cooling, butyl acetate was added to adjust the nonvolatile content to 80%.

The resultant lactic acid polymer (A) had a lactic acid average polymerization degree of 10, an SP value of 13.2 and a hydroxyl group value of 198.7 mgKOH/g.

Synthesis Example 4

The same reactor as of Synthesis Example 1 was charged with 15.9 g of trimellitic acid, 734.1 g of L-lactic acid (produced by Purac Ltd.), 50 g of toluene, and 0.15 g of p-toluenesulfonic acid. In addition, the dean-stark trap was filled with toluene to the upper limit. Under a nitrogen gas flow, the temperature in the system was raised to 140° C., which was retained for 1 hour. Furthermore, the temperature in the system was raised to 175° C., and a condensation reaction was continued for 7 hours. After it had been confirmed that the acid value of the resin had become not more than 22 mgKOH/g (resin nonvolatile), cooling was started. After the cooling, butyl acetate was added to adjust the nonvolatile content to 80%.

The resultant lactic acid polymer (A) had a lactic acid average polymerization degree of 36, an SP value of 11.5 and an acid value of 21.1 mgKOH/g.

Synthesis Example 5

The same reactor as of Synthesis Example 1 was charged with 82.8 g of dimethylolpropanoic acid, 667.2 g of L-lactic acid (produced by Purac Ltd.), 50 g of toluene, and 0.15 g of p-toluenesulfonic acid. In addition, the dean-stark trap was filled with toluene to the upper limit. Under a nitrogen gas flow, the temperature in the system was raised to 140° C., which was retained for 1 hour. Furthermore, the temperature in the system was raised to 175° C., and a condensation reaction was continued for 5 hours. After it had been confirmed that the acid value of the resin had become not more than 57 mgKOH/g (resin nonvolatile), cooling was started. After the cooling, propylene glycol monomethyl ether was added to adjust the nonvolatile content to 80%.

The resultant lactic acid polymer (A) had a lactic acid average polymerization degree of 4, an SP value of 13.2, a hydroxyl group value of 111.3 mgKOH/g and an acid value of 55.7 mgKOH/g.

Synthesis Example of Comparative Lactic Acid Polymer (A')

Synthesis Example 6

The same reactor as of Synthesis Example 1 was charged with 15.3 g of 1,4-butanediol, 734.7 g of L-lactic acid (produced by Purac Ltd.), 50 g of toluene, and 0.15 g of p-toluenesulfonic acid. In addition, the dean-stark trap was filled with toluene to the upper limit. Under a nitrogen gas flow, the temperature in the system was raised to 140° C., which was retained for 1 hour. Furthermore, the temperature in the system was raised to 175° C., and a condensation reaction was continued for 5 hours. After it had been confirmed that the acid value of the resin had become not more than 4 mgKOH/g (resin nonvolatile), cooling was started. After the cooling, butyl acetate was added to adjust the nonvolatile content to 80%.

The resultant comparative lactic acid polymer (A') had a lactic acid average polymerization degree of 24, an SP value of 11.5 and a hydroxyl group value of 31.6 mgKOH/g.

Synthesis Example of Modified Starch

Synthesis Example 7

Into water, 100 g (in terms of anhydride) of high amylose corn starch was suspended to prepare a slurry having a concentration of 40 weight %. Under stirring, this slurry was heated in a thermostat as set for 52° C., and thereto hydrochloric acid having a concentration of 15 weight % was added in an amount of 15 weight % relative to the aforementioned high amylose corn starch. Under stirring, the slurry was retained at 52° C. for 4 hours from the start of the addition of hydrochloric acid, thereby performing an acid treatment. Thereafter, the slurry was iced to 30° C. and neutralized to the pH range of 6.5 to 7 with a sodium hydroxide solution having a concentration of 2 weight %. Therefrom, water was removed with a Buchner funnel, and the residue thereon was washed by suspending it into an ethanol solution having a concentration of 50 weight %, wherein the amount of the ethanol solution was 5 times as large as the nonvolatile of the high amylose corn starch. This washing was performed 2 times, and the resultant wet cake was dried with a warm air drier of 30° C. for one night. Thereafter, 80 g of the resultant high amylose corn starch having a weight-average molecular weight of about 15,000 was suspended into 640 g of dimethyl sulfoxide (DMSO) and heated to 90° C. in an oil bath under stirring and retained at 90° C. for 30 minutes and thereby pasted. To this solution, 64 g of sodium bicarbonate was added, and then vinyl laurate was added in an amount of 1 mol per 1 mol of the saccharide residue of the aforementioned high amylose corn starch, and a reaction was run at 90° C. for 1 hour. Next, vinyl acetate was added in an amount of 2.5 mol per 1 mol of the saccharide residue of the aforementioned high amylose corn starch, and in the same way, a reaction was run at 90° C. for 1 hour. The reaction liquid was suspended into a large amount of water to deposit a product. This product was pulverized with a mixer and recovered with a Buchner funnel. The recovered product was vacuum dried at 40° C. for one night. As a result, a modified starch having a weight-average molecular weight of about 20,000, a laurate ester group substitution degree of 0.60 and an acetyl group substitution degree of 1.60 was obtained.

The obtained modified starch had an SP value of 10.6 and a hydroxyl group value of 130 mgKOH/g.

Synthesis Examples of Resins (B)

Synthesis Example 8

A separable flask of 1 L in capacity as equipped with a thermostat, a stirring blade, a nitrogen-introducing inlet, a dropping funnel and a reflux condenser was charged with 230 g of butyl acetate, which was then heated to 120° C. Thereto, a mixed liquid of 128.0 g of styrene, 20.0 g of methyl methacrylate, 24.0 g of n-butyl acrylate, 144.0 g of n-butyl methacrylate, 40.0 g of hydroxyethyl methacrylate, 40.0 g of Placcel FM-2 (produced by Daicel Chemical Industries, Ltd.), and 8.0 g of azobisisobutyronitrile was dropwise added over a period of 3 hours. Then, 1 hour later than the completion of the dropwise addition, a mixed liquid of 0.8 g of azobisisobutyronitrile and 37.0 g of butyl acetate was dropwise added over a period of 1 hour. Then, 1 hour later than the completion of the dropwise addition, cooling was started.

The resultant resin (B) (acrylic resin) had a weight-average molecular weight of 8,720, an SP value of 9.9 and a hydroxyl group value of 63 mgKOH/g.

Synthesis Example 9

The same reactor as of Synthesis Example 8 was charged with 230 g of butyl acetate, which was then heated to 110° C. Thereto, a mixed liquid of 16.0 g of styrene, 132.0 g of methyl methacrylate, 24.0 g of n-butyl acrylate, 96.0 g of n-butyl methacrylate, 4.0 g of methacrylic acid, 68.0 g of hydroxyethyl methacrylate, 60.0 g of Placcel FM-2 (produced by Daicel Chemical Industries, Ltd.), and 8.0 g of azobisisobutyronitrile was dropwise added over a period of 3 hours. Then, 1 hour later than the completion of the dropwise addition, a mixed liquid of 0.8 g of azobisisobutyronitrile and 37.0 g of butyl acetate was dropwise added over a period of 1 hour. Then, 1 hour later than the completion of the dropwise addition, cooling was started.

The resultant resin (B) (acrylic resin) had a weight-average molecular weight of 14,340, an SP value of 10.9, a hydroxyl group value of 97 mgKOH/g and an acid value of 6.5 mgKOH/g.

Synthesis Example 10

The same reactor as of Synthesis Example 8 was charged with 230 g of butyl acetate, which was then heated to 100° C. Thereto, a mixed liquid of 24 g of 2-ethylhexyl acrylate, 144 g of ethyl acrylate, 32.0 g of methacrylic acid, 112.0 g of hydroxyethyl methacrylate, 88.0 g of Placcel FM-2 (produced by Daicel Chemical Industries, Ltd.), and 8.0 g of azobisisobutyronitrile was dropwise added over a period of 3 hours. Then, 1 hour later than the completion of the dropwise addition, a mixed liquid of 0.8 g of azobisisobutyronitrile and 37.0 g of butyl acetate was dropwise added over a period of 1 hour. Then, 1 hour later than the completion of the dropwise addition, cooling was started.

The resultant resin (B) (acrylic resin) had a weight-average molecular weight of 21,160, an SP value of 12.2, a hydroxyl group value of 155 mgKOH/g and an acid value of 52 mgKOH/g.

Synthesis Example 11

The same reactor as of Synthesis Example 8 was charged with 347.8 g of xylene and 400.0 g of T4692 (polycarbonate diol, produced by Asahi Kasei Corporation), which were then heated to 80° C. Thereto, 0.8 g of dibutyltin laurate was added, and then 67.3 g of hexamethylene diisocyanate was added, and an urethane formation reaction was continued for 2 hours, and thereafter 54.5 g of pentaerythritol was added, and the reaction was continued for another 4 hours.

The resultant resin (B) with a carbonate bond and a urethane bond had a weight-average molecular weight of 2,860, an SP value of 11.6 and a hydroxyl group value of 129 mgKOH/g.

Synthesis Example 12

The same reactor as of Synthesis Example 1 was charged with 233.4 g of xylene and 300.6 g of P-3050 (polyester diol, produced by Kuraray Corporation), which were then heated to 100° C. Thereto, 0.6 g of dibutyltin laurate was added, and then 33.3 g of isophorone diisocyanate was added, and an urethane formation reaction was continued for 2 hours, and thereafter 16.0 g of 1,9-nonanediol was added, and the reaction was continued for another 4 hours.

The resultant resin (B) with an ester bond and a urethane bond had a weight-average molecular weight of 9,450, an SP value of 11.4 and a hydroxyl group value of 16.1 mgKOH/g.

Synthesis Example 13

The same reactor as of Synthesis Example 8 was charged with 230 g of butyl acetate, which was then heated to 100° C. Thereto, a mixed liquid of 32.0 g of 2-ethylhexyl acrylate, 144.0 g of ethyl acrylate, 24.0 g of methacrylic acid, 112.0 g of hydroxyethyl methacrylate, 88.0 g of Placcel FM-2 (produced by Daicel Chemical Industries, Ltd.), and 8.0 g of azobisisobutyronitrile was dropwise added over a period of 3 hours. Then, 1 hour later than the completion of the dropwise addition, a mixed liquid of 0.8 g of azobisisobutyronitrile and 37.0 g of butyl acetate was dropwise added over a period of 1 hour. Then, 1 hour later than the completion of the dropwise addition, cooling was started.

The resultant resin (B) (acrylic resin) had a weight-average molecular weight of 20,100 and an SP value of 11.9.

Coating Compositions and its Coated Articles

Example 1

An amount of 35.0 g of the lactic acid polymer (A) of Synthesis Example 1 (SP value=11.9), 20.0 g of the resin (B) of Synthesis Example 8 (acrylic resin, SP value=9.9), 7.0 g of Duranate TPA-100 (produced by Asahi Kasei Corporation), 94.7 g of butyl acetate, 0.25 g of L-7604 (produced by Dow Corning Toray Co., Ltd.), and 0.05 g of dibutyltin laurate were mixed together until becoming uniform and transparent, and the resultant mixture was spray-coated onto an ABS base material so as to form a coating film having a thickness of 30±3 μm.

After the coating, the material was left at room temperature for 10 minutes, and then the temperature of the coating film was heated to 100° C., and this temperature was maintained for 30 minutes to carry out drying, thereby preparing a test piece of Example 1.

The evaluation of the coating film was carried out after 24 hours had passed since the completion of the drying.

EXAMPLES 2 to 4

Test pieces of Examples 2 to 4 were prepared in the same way as of Example 1 except that the formulation was changed respectively as follows. The evaluation of the coating film was carried out after 24 hours had passed since the completion of the drying.

Example 2

| | |
|---|---|
| Lactic acid polymer (A) of Synthesis Example 2 (SP value = 12.4) | 40.0 g |
| Resin (B) of Synthesis Example 8 (acrylic resin, SP value = 9.9) | 13.3 g |
| Duranate TPA-100 (produced by Asahi Kasei Corporation) | 20.6 g |
| Butyl acetate | 128.2 g |
| L-7604 (produced by Dow Corning Toray Co., Ltd.) | 0.25 g |
| Dibutyltin laurate | 0.05 g |

Example 3

| | |
|---|---|
| Lactic acid polymer (A) of Synthesis Example 3 (SP value = 13.2) | 40.0 g |
| Resin (B) of Synthesis Example 9 (acrylic resin, SP value = 10.9) | 13.3 g |
| Duranate TPA-100 (produced by Asahi Kasei Corporation) | 24.2 g |
| Butyl acetate | 136.5 g |
| L-7604 (produced by Dow Corning Toray Co., Ltd.) | 0.25 g |
| Dibutyltin laurate | 0.05 g |

Example 4

| | |
|---|---|
| Lactic acid polymer (A) of Synthesis Example 4 (SP value = 11.5) | 20.0 g |
| Resin (B) of Synthesis Example 9 (acrylic resin, SP value = 10.9) | 40.0 g |
| Duranate TPA-100 (produced by Asahi Kasei Corporation) | 7.9 g |
| Carbodirite V-02 (Nisshinbo Co., Ltd.) | 3.2 g |
| Butyl acetate | 91.8 g |
| L-7604 (produced by Dow Corning Toray Co., Ltd.) | 0.25 g |
| Dibutyltin laurate | 0.05 g |

Example 5

An amount of 46.7 g of the lactic acid polymer (A) of Synthesis Example 5 (SP value=13.3), 15.0 g of the resin (B) of Synthesis Example 10 (acrylic resin, SP value=12.2), 3.4 g of triethylamine, 0.05 g of dibutyltin laurate, 0.50 g of Polyflow KL-245 (produced by Kyoeisha Chemical Co., Ltd.), and 0.30 g of Surfynol 104PA (produced by Air Products Corporation) were mixed together until becoming homogeneous, and thereinto 256.3 g of deionized water was mixed, thereby obtaining an aqueous resin dispersion. Thereinto 19.3 g of Bayhydur 305 (produced by Sumitomo-Bayer Urethane Co., Ltd.) and 14.0 g of Carbodirite V-02 (Nisshinbo Co., Ltd.) were mixed until becoming homogeneous, and the resultant mixture was spray-coated onto an ABS base material so as to form a coating film having a thickness of 30±3 μm. After the coating, the material was left at room temperature for 10 minutes and then dried at 100° C. for 40 minutes, thereby preparing a test piece of Example 5.

The evaluation of the coating film was carried out after 24 hours had passed since the completion of the drying.

Example 6

A one-package type urethane coating "R333Base Black Coating (produced by Nippon Bee Chemical Co., Ltd.)" was spray-coated onto an ABS base material so as to form a coating film having a thickness of 15±3 μm. The material was left for 10 minutes. Thereafter, a clear coating of Example 1 was coated so as to form a coating film having a thickness of 30±3 μm, and then the material was left at room temperature for 10 minutes, and then the temperature of the coating film was heated to 120° C., and this temperature was maintained for 30 minutes, thereby forming a clear coating film on a colored layer to prepare a test piece of Example 6.

The evaluation of the coating film was carried out after 24 hours had passed since the completion of the drying.

Example 7

A one-package type urethane coating "R333 Base Black Coating (produced by Nippon Bee Chemical Co., Ltd.)" was spray-coated onto an ABS base material so as to form a coating film having a thickness of 15±3 μm. The material was left for 10 minutes. Thereafter, a clear coating of Example 2 was coated so as to form a coating film having a thickness of 30±3 μm, and then the material was left at room temperature for 10 minutes, and then the temperature of the coating film was heated to 120° C., and this temperature was maintained for 30 minutes, thereby forming a clear coating film on a colored layer to prepare a test piece of Example 7.

The evaluation of the coating film was carried out after 24 hours had passed since the completion of the drying.

Example 8

A mixed liquid of 0.05 g of dibutyltin laurate and 20.0 g of xylene, 0.02 g of BYKETOL SPECIAL (produced by BYK Chemie, Japan) was added to a black pigment dispersion comprising 40.0 g of the lactic acid polymer (A) of Synthesis Example 2 (SP value=12.4), 13.3 g of the resin (B) of Synthesis Example 9 (acrylic resin, SP value=10.9), 2.0 g of Monarc 1300 (produced by Cabot Specialty Chemicals Inc.), and 64.7 g of butyl acetate. Furthermore, 21.2 g of Duranate 24A-100 (produced by Asahi Kasei Corporation) was added to homogenize the mixture, and the homogenized mixture was spray-coated onto an ABS base material so as to form a coating film having a thickness of 30±3 μm.

After the coating, the material was left at room temperature for 10 minutes, and then the temperature of the coating film was heated to 100° C., and this temperature was maintained for 30 minutes to carry out drying, thereby preparing a test piece of Example 8.

The evaluation of the coating film was carried out after 24 hours had passed since the completion of the drying.

Example 9

A mixed liquid of 0.05 g of dibutyltin laurate and 20.0 g of xylene, 0.02 g of BYKETOL SPECIAL (produced by BYK Chemie, Japan) was added to a black pigment dispersion comprising 30.0 g of the lactic acid polymer (A) of Synthesis Example 3 (SP value=13.2), 26.7 g of the resin (B) of Synthesis Example 9 (acrylic resin, SP value=10.9), 2.0 g of Monarc 1300 (produced by Cabot Specialty Chemicals Inc.), and 61.3 g of butyl acetate. Furthermore, 21.1 g of Duranate 24A-100 (produced by Asahi Kasei Corporation) was added to homogenize the mixture, and thereafter in the same way as of Example 8, a test piece was prepared.

Example 10

An amount of 35.0 g of the lactic acid polymer (A) of Synthesis Example 1 (SP value=11.9), 20.0 g of the resin (B) of Synthesis Example 11 having a carbonate bond and a urethane bond (SP value=11.6), 9.5 g of Duranate 24A-100 (produced by Asahi Kasei Corporation), 98.6 g of butyl acetate, 0.25 g of L-7604 (produced by Dow Corning Toray Co., Ltd.), and 0.05 g of dibutyltin laurate were mixed together until becoming uniform and transparent, and the resultant mixture was spray-coated onto an ABS base material so as to form a coating film having a thickness of 30±3 μm.

After the coating, the material was left at room temperature for 10 minutes, and then the temperature of the coating film was heated to 100° C., and this temperature was maintained for 30 minutes to carry out drying, thereby preparing a test piece of Example 10.

The evaluation of the coating film was carried out after 24 hours had passed since the completion of the drying.

Example 11

An amount of 40.0 g of the lactic acid polymer (A) of Synthesis Example 2 (SP value=12.4), 10.0 g of the resin (B) of Synthesis Example 12 having an ester bond and a urethane bond (SP value=11.4), 19.0 g of Duranate 24A-100 (produced by Asahi Kasei Corporation), 119.8 g of butyl acetate, 0.25 g of L-7604 (produced by Dow Corning Toray Co., Ltd.), and 0.05 g of dibutyltin laurate were mixed together until becoming uniform and transparent, and the resultant mixture was spray-coated onto an ABS base material so as to form a coating film having a thickness of 30±3 μm.

After the coating, the material was left at room temperature for 10 minutes, and then the temperature of the coating film was heated to 100° C., and this temperature was maintained for 30 minutes to carry out drying, thereby preparing a test piece of Example 11.

The evaluation of the coating film was carried out after 24 hours had passed since the completion of the drying.

Comparative Examples 1 to 4

Test pieces of Comparative Examples 1 to 4 were prepared in the same way as of Example 1 except that the formulation was changed respectively as follows. The evaluation of the coating film was carried out after 24 hours had passed since the completion of the drying.

Comparative Example 1

| | |
|---|---|
| Comparative lactic acid polymer (A') of Synthesis Example 6 (SP value = 11.5) | 25.0 g |
| Resin (B) of Synthesis Example 9 (acrylic resin, SP value = 10.9) | 33.3 g |
| Duranate TPA-100 (produced by Asahi Kasei Corporation) | 8.6 g |
| Butyl acetate | 94.1 g |
| L-7604 (produced by Dow Corning Toray Co., Ltd.) | 0.25 g |
| Dibutyltin laurate | 0.05 g |

Comparative Example 2

| | |
|---|---|
| Modified starch of Synthesis Example 7 (SP value = 10.6) | 40.0 g |
| Duranate TPA-100 (produced by Asahi Kasei Corporation) | 17.4 g |
| Butyl acetate | 133.8 g |
| L-7604 (produced by Dow Corning Toray Co., Ltd.) | 0.25 g |
| Dibutyltin laurate | 0.05 g |

Comparative Example 3

| | |
|---|---|
| Lactic acid polymer (A) of Synthesis Example 2 (SP value = 12.4) | 66.7 g |
| Duranate TPA-100 (produced by Asahi Kasei Corporation) | 23.3 g |
| Butyl acetate | 111.0 g |
| L-7604 (produced by Dow Corning Toray Co., Ltd.) | 0.25 g |
| Dibutyltin laurate | 0.05 g |

Comparative Example 4

| | |
|---|---|
| Lactic acid polymer (A) of Synthesis Example 1 (SP value = 11.9) | 35.0 g |
| Resin (B) of Synthesis Example 18 (acrylic resin, SP value = 11.9) | 20.0 g |
| Duranate TPA-100 (produced by Asahi Kasei Corporation) | 10.8 g |
| Butyl acetate | 103.5 g |
| L-7604 (produced by Dow Corning Toray Co., Ltd.) | 0.50 g |
| Dibutyltin laurate | 0.05 g |

[Evaluation and its Results]:

As to the above test pieces according to Examples 1 to 11 and Comparative Examples 1 to 4, the following tests were carried out. Its results are shown in Table 1.

TABLE 1

| | Appearance | 60° gloss | Initial adhesion | Humidity resistance | Alkali resistance | Water resistance | Acid resistance |
|---|---|---|---|---|---|---|---|
| Example 1 | ○ | ○ | ○ | ○ | ○ | ○ | ○ |
| Example 2 | ○ | ○ | ○ | ○ | ○ | ○ | ○ |
| Example 3 | ○ | ○ | ○ | ○ | ○ | ○ | ○ |
| Example 4 | ○ | ○ | ○ | ○ | ○ | ○ | ○ |
| Example 5 | ○ | ○ | ○ | ○ | ○ | ○ | ○ |
| Example 6 | ○ | ○ | ○ | ○ | ○ | ○ | ○ |
| Example 7 | ○ | ○ | ○ | ○ | ○ | ○ | ○ |
| Example 8 | ○ | ○ | ○ | ○ | ○ | ○ | ○ |
| Example 9 | ○ | ○ | ○ | ○ | ○ | ○ | ○ |
| Example 10 | ○ | ○ | ○ | ○ | ○ | ○ | ○ |
| Example 11 | ○ | ○ | ○ | ○ | ○ | ○ | ○ |
| Comparative Example 1 | ○ | ○ | ○ | X | X | X | X |
| Comparative Example 2 | ○ | ○ | ○ | X | X | X | X |
| Comparative Example 3 | ○ | ○ | X | X | X | X | X |
| Comparative Example 4 | ○ | ○ | ○ | X | X | X | X |

<Appearance>:

It is evaluated on the following standards by eye measurement of the coating film surface.

○: No abnormality of the coating film surface such as swelling, cracking or pinhole is seen.

x: Abnormality of the coating film surface such as swelling, cracking or pinhole is seen.

<60° Gloss>:

It is evaluated by measuring the 60° gloss using a mirror gloss meter in accordance with JIS-K-5600-4-7.

○: The 60° gloss is not less than 85.

x: The 60° gloss is less than 85.

<Initial Adhesion>:

It is evaluated in accordance with JIS-K-5600-5-6. Specifically, 100 checkerboard squares of 2 mm-square are formed on the coating film with a cutter knife, and onto these squares, a cellophane pressure sensitive adhesive tape is completely attached, and one opposite end of the tape is lifted and thereby released upward. This releasing operation is carried out 3 times in the same place, and the initial adhesion is evaluated as follows, based on the number of squares in which the coating film has peeled off in an area ratio of not less than 50% within one square.

○: The number of squares of peeling off is 0.

x: The number of squares of peeling off is not smaller than 1.

<Humidity Resistance>:

It is evaluated in accordance with JIS-K-5600-7-12. Specifically, the coating film is left for 240 hours in an atmosphere having a temperature of 50±2° C. and a humidity of 98±2%, and within 1 hour thereafter, the coating film surface is observed and subjected to a checkerboard square adhesion test. The checkerboard square adhesion test is carried out as follows. That is to say, 100 checkerboard squares of 2 mm-square are formed on the coating film with a cutter knife, and onto these squares, a cellophane pressure sensitive adhesive tape is completely attached, and one opposite end of the tape is lifted and thereby released upward. This releasing operation is carried out 3 times in the same place, and the adhesion is shown by the number of squares in which the coating film has been peeled off in an area ratio of not less than 50% within one square.

○: No abnormality of the coating film surface such as clouding or swelling is seen, and the number of squares of peeling off is 0.

x: Abnormality of the coating film surface such as clouding or swelling is seen, or the number of squares of peeling off is not smaller than 1.

<Alkali Resistance>:

It is evaluated in accordance with JIS-K-5600-6-1. Specifically, the coating film surface is provided with a cylindrical ring, and thereinto 5 mL of a 0.1N aqueous sodium hydroxide solution is added, and the cylindrical ring is closed with a glass plate and then left at 55° C. for 4 hours. Thereafter, the coating film surface is washed with water and observed.

○: No abnormality of the coating film surface such as clouding or swelling is seen.

x: Abnormality of the coating film surface such as clouding or swelling is seen.

<Water Resistance>:

It is evaluated in accordance with JIS-K-5600-6-1. Specifically, the coating film surface is provided with a cylindrical ring, and thereinto 5 mL of distilled water is added, and the cylindrical ring is closed with a glass plate and then left at 55° C. for 4 hours. Thereafter, the coating film surface is washed with water and observed.

◯: No abnormality of the coating film surface such as clouding or swelling is seen.

x: Abnormality of the coating film surface such as clouding or swelling is seen.

<Acid Resistance>:

It is evaluated in accordance with JIS-K-5600-6-1. Specifically, the coating film surface is provided with a cylindrical ring, and thereinto 5 mL of 0.1N sulfuric acid is added, and the cylindrical ring is closed with a glass plate and then left at room temperature for 24 hours. Thereafter, the coating film surface is washed with water and observed.

◯: No abnormality of the coating film surface such as contamination or swelling is seen.

x: Abnormality of the coating film surface such as contamination or swelling is seen.

[Consideration]:

From the above results as shown in Table 1, it is understood that as to all of Examples 1 to 11, all evaluation items are ◯. That is to say, it has been confirmed that although they are coating compositions of high bio-based content, they display extremely high hydrolysis resistance as well as provide good results with regard to other coating film performances such as appearance, gloss, and initial adhesion.

As to Comparative Example 1, the comparative lactic acid polymer (A') of Synthesis Example 6 in which 1,4-butanediol having a functionality of 2 is used as a monomer ingredient is used, and this comparative lactic acid polymer (A') does not have any branched structure, so that the hydrolysis resistance is insufficient, and the humidity resistance, the alkali resistance, the water resistance and the acid resistance are low.

As to Comparative Example 2, neither the lactic acid polymer (A) nor the resin (B) is used, and instead the modified starch is used. However, similarly to Comparative Example 1, the humidity resistance, the alkali resistance, the water resistance and the acid resistance are low.

As to Comparative Example 3, the lactic acid polymer (A) of Synthesis Example 2 is used similarly to Example 2, but the resin (B) is not used. Therefore, similarly to Comparative Example 1, the humidity resistance, the alkali resistance, the water resistance and the acid resistance are low. Furthermore, the initial adhesion is also low.

As to Comparative Example 4, there is no difference between the SP values of the lactic acid polymer (A) and the resin (B) (i.e. ΔSP=0). Therefore, the humidity resistance, the alkali resistance, the water resistance and the acid resistance are low.

INDUSTRIAL APPLICATION

The present invention can, for example, be utilized as a coating composition and its coated article which coating composition imposes only a little environmental burden while having excellent coating film performances in various fields in which coating compositions are used.

What is claimed is:

1. A bio-based coating composition, comprising the following film-forming ingredients:
    a lactic acid polymer (A) which has a highly branched structure obtained by reacting a polyfunctional monomer compound having a hydroxyl group and/or a carboxyl group with a functionality of not less than 3 and lactic acid as essential monomer ingredients and has an SP value of 10.0 to 15.0; and
    a resin (B) which contains a hydroxyl group and/or a carboxyl group and has an SP value of 9.5 to 14.0;
    wherein the difference (ΔSP) between the SP values of the lactic acid polymer (A) and the resin (B) is in the range of 0.2 to 4.0.

2. The bio-based coating composition according to claim 1, wherein the mixing ratio of the lactic acid polymer (A)/the resin (B) is, by weight, in the range of 95/5 to 25/75.

3. The bio-based coating composition according to claim 1, further comprising, as a curing agent, a compound having a functional group capable of reacting with the hydroxyl group and/or the carboxyl group in the film-forming ingredients.

4. The bio-based coating composition according to claim 1, further comprising a carbodiimide compound as a hydrolysis inhibitor.

5. The bio-based coating composition according to claim 1, which is an organic solvent type coating composition in which the film-forming ingredients are dissolved or dispersed in an organic solvent.

6. The bio-based coating composition according to claim 1, which is an aqueous coating composition in which the film-forming ingredients are dissolved or dispersed in an aqueous solvent.

7. The bio-based coating composition according to claim 1, which is a coating.

8. A coated article, being obtained by being coated with the coating composition as recited in claim 1.

9. The bio-based coating composition according to claim 1, wherein said monomers for producing said lactic acid polymer (A) have an average functionality of 2.2 to 30.

10. The bio-based coating composition according to claim 1, wherein said monomers for producing said lactic acid polymer (A) have an average functionality of 2.5 to 10.

* * * * *